May 17, 1949.  G. O. YOUNG  2,470,125
AUTOMATIC BEAM LETOFF
Filed Sept. 2, 1947
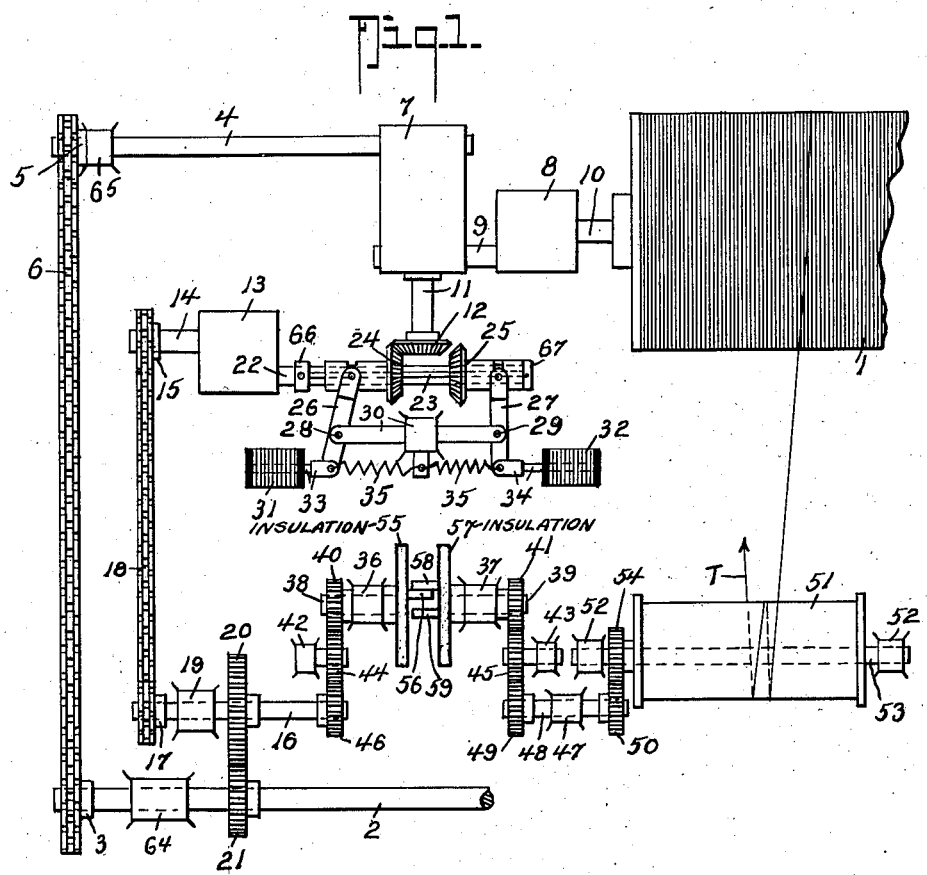
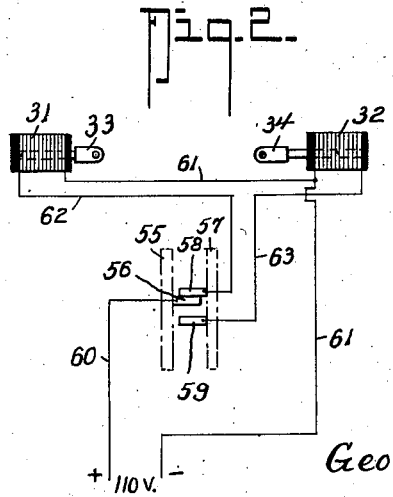
Inventor,
George Ostrom Young,
By Albert E. Dieterich,
Attorney.

Patented May 17, 1949

2,470,125

UNITED STATES PATENT OFFICE 2,470,125

AUTOMATIC BEAM LETOFF

George O. Young, Robesonia, Pa., assignor to Vanity Fair Mills, Inc., Reading, Pa., a corporation of Pennsylvania Application September 2, 1947, Serial No. 771,620

7 Claims. (Cl. 66—86)

My invention relates to the art of knitting machines wherein the thread or yarn is fed from the beam to the needles of the knitting machines in a positive manner. To prevent formation of so-called stop marks in the knitted fabric the rate of feed of the thread or yarn to the needles of the machine must be constant, i. e., the thread should leave the beam at a predetermined constant linear speed throughout the knitting operation. It is to provide an improved means for accomplishing the desired result that I have devised my present invention.

To the attainment of the above object my invention resides in the novel features of construction, combinations and arrangements of parts all of which will first be fully described hereinafter and then be specifically pointed out in the appended claims, reference being had to the accompanying drawing in which:

Fig. 1 is a schematic view illustrating my invention.

Fig. 2 is a wiring diagram for the magnets and switch.

In the drawing in which like numerals and letters of reference indicate like parts in all the figures, 1 represents the beam of a conventional flat-knitting machine and 2 the cam shaft of the same which is mounted in a suitable bearing 64.

In carrying out my invention I provide a positive infinitely variable power transmitting unit 7 whose drive shaft 4 is mounted in a suitable bearing 65 and carries a sprocket 5 over which and a sprocket 3 on shaft 2 an endless chain 6 passes. The output shaft 9 of the unit 7 connects with a speed reducer 8, which reducer has an output shaft 10 connected to drive the beam 1. The unit 7 includes an adjuster shaft 11 which carries a suitable gear 12 to mesh with gears 24, 25 at times, as will later more fully appear.

13 is a speed reducer whose input shaft 14 carries a sprocket 15 over which and a sprocket 17 on a countershaft 16, an endless chain 18 passes. The shaft 16 has a gear 20 that meshes with a driving gear 21 on the cam shaft 2. The output shaft 22 of the speed reducer 13 is extended and has a long spline 23. Two sliding gears 24, 25 (heretofore mentioned) operate on shaft 22, one on either side of gear 12. Their movement is limited by collars 66 and 67 on shaft 22.

A gear shifting lever 26 is connected with gear 24 and is pivoted at 28 to a fixed support 30 while a similar lever 27 is pivoted at 29 to the support 30 and is connected with gear 25.

An electromagnet 31 of the solenoid type has its plunger 33 connected to lever 26 while a similar magnet 32 has its plunger 34 connected to the lever 27. Coil springs 35, connected to the support 30, serve to move levers 26 and 27 to disengage the gears.

The circuit controller or switch comprises two insulation discs 55 and 57, one of which, 55, has a contact pin 56 which operates between two contact pins 58 and 59 on the disc 57. The disc 55 is mounted on a shaft 38, journalled in a suitable bearing 36 and carrying a gear 40, while disc 57 is mounted on a shaft 39, journalled in a suitable bearing 37 and carrying a gear 41. The shafts 38 and 39 have their axes in alignment. Contact pin 56 is electrically connected by wire 60 to the positive pole of a suitable source of energy while the negative pole of the same is connected by wires 61 to one terminal each of coils 31 and 32. The other terminal of coil 31 is connected by wire 62 to contact pin 58 while the other terminal of coil 32 is connected by wire 63 to contact 59 (see Fig. 2).

44 and 45 are idler gears whose shafts are suitably journalled in bearings 42 and 43 respectively. Gear 44 meshes with gear 40 and gear 45 meshes with gear 41. Gear 44 also meshes with a gear 46 on shaft 16. Gear 45 meshes with a gear 49 on a countershaft 48 that is journalled in a suitable bearing 47 and has a gear 50 that meshes with a gear 54 on the shaft 53, being journalled in suitable bearings 52.

One or more threads T from the beam are given a few turns about the pilot drum 51 before going to the needle guides.

Operation

In practice discs 55 and 57 are set with gears to rotate at a predetermined speed with pin 56 clear of contacts 58 and 59. Disc 57 it will be seen is driven by the thread or yarn T while the other disc is driven by the cam shaft at a fixed speed. The speed of each disc 55, 57 should correspond with the correct gears and diameter of drum 51. If the speeds do not correspond pin 56 will contact either pin 58 or pin 59 accordingly as disc 55 travels faster than disc 57 or vice versa. As illustrated disc 55 is traveling faster than disc 57 so that pin 56 has contacted pin 58 and closed the circuit through magnet 31 which has brought gears 24 and 12 into mesh, thereby effecting variable speed unit to increase the speed of drum 1 and allow the thread T to move faster. This causes drum 51 to increase its speed until the speed of disc 57 again reaches the speed of disc 55 (or slightly more) to break the circuit between pins 56 and 58 which allows spring 35, connected to plunger 53, to shift gear 24 out of mesh with gear 12 and stop the operation of adjuster shaft 11. When speed of disc 57 exceeds that of disc 55 sufficiently to cause contact between pins 56 and 59 gear 25 is shifted to mesh with gear 12 and reverse the adjustment of unit 7 and slow down the beam. This make and break contact and intermittent operation of adjuster shaft 11 takes place almost continuously during operation of the knitting machine to maintain a substantially uniform feed of the thread and a substantially uniform tension on the same.

From the foregoing description taken in connection with the accompanying drawing it is thought my invention, its construction, operation and advantages, will be clear to those skilled in the art to which it relates.

What I claim is:

1. In mechanism of the class described, the combination with the cam shaft of a knitting machine and a beam of the same, of two control shafts, means for driving one control shaft from said cam shaft, means for driving the other control shaft by the thread from the beam and in the same direction as the first control shaft turns and at approximately the same speed, means for driving the beam from the cam shaft, said last named means including an infinitely variable speed changing power transmission unit which includes an adjuster shaft, a pair of shiftable gears slidably mounted on a counter shaft driven from the crank shaft, electro-magnetic gear shifters for said shiftable gears, a circuit switch including cooperating switching elements on said control shafts, operative connection between said switching elements and a source of electric energy and with said electro-magnetic gear shifters and operating upon a speed differential between said control shafts, for changing the adjustment of said unit to tend to equalize the speeds of said control shafts.

2. In mechanism of the class described wherein a knitting machine is provided with a cam shaft and a beam, needles and thread guides: the improvement which comprises an infinitely variable speed power transmission unit operatively connected with the cam shaft and the beam for driving the beam, said unit including an adjuster, a pilot drum around which thread is wound before passing to the thread guide for the needles, combined with electro-magnetically operated means for operating said adjuster, and means controlled by speed differentials between that of the cam shaft and that of said pilot drum for operating said electro-magnetically operated means to adjust said unit to tend to neutralize said differential speed.

3. In mechanism of the class described wherein a knitting machine is provided with a cam shaft and a beam, needles and thread guides: the improvement which comprises an infinitely variable speed power transmission unit operatively connected with the cam shaft and the beam for driving the beam, said unit including an adjuster, a pilot drum around which thread is wound before passing to the thread guides for the needles, combined with electro-magnetically operated means for operating said adjuster, and means controlled by speed differentials between that of the cam shaft and that of said pilot drum for operating said electro-magnetically operated means to adjust said unit to tend to neutralize said differential speed, said controlled means including a cam shaft driven disc having a circuit contact pin and a pilot drum driven disc having a pair of contact pins between which said first mentioned pin operates by virtue of all of which the thread will be delivered to the thread guides and needles at a substantially constant linear speed.

4. In a beam let-off for a knitting machine which has a beam and a first motion shaft; the improvement which comprises a power transmitting connection between said shaft and the beam, which connection includes an infinitely variable speed changing unit having an adjusting shaft; a pilot drum around which thread from the beam passes; and electro-magnetically operated means controlled by speed differentials between the first motion shaft and the pilot drum for operating said adjusting shaft to effect a constant linear speed to be imparted to the thread leaving the beam.

5. In a beam let-off for a knitting machine which has a beam and a first motion shaft; the improvement which comprises a power transmitting connection between said shaft and the beam, which connection includes an infinitely variable speed changing unit having an adjusting shaft; a pilot drum around which thread from the beam passes; and electro-magnetically operated means controlled by speed differentials between the first motion shaft and the pilot drum for operating said adjusting shaft to effect a constant linear speed to be imparted to the thread leaving the beam, said electro-magnetically operated means and its controlling means comprising adjuster shaft reversing devices, solenoidal magnets operatively connected with said reversing devices, a two-part switch one part of which is operated from said first motion switch and the other part of which is operated from said pilot drum, and circuit closing contacts carried by said switch parts and cooperatively connected by electrical connections with a source of energy and with said magnets to operate the same.

6. In an automatic beam let-off for knitting machines wherein is provided a first motion shaft and a beam; an infinitely variable speed power transmitting unit including an input shaft, an output shaft and an adjuster shaft; a driving connection between said first motion shaft and said input shaft; a driving connection between said output shaft and said beam, said last named driving connection including a speed reducer; a splined shaft; a driving connection including a speed reducer between said first motion shaft and said splined shaft; shiftable gear connections between said splined shaft and said adjuster shaft; electro-magnetically actuated gear shifters for said shiftable gear connections for operating said adjuster shaft in reversed directions at times, a pilot drum around which thread from the beam is wound before passing to thread guides of the knitting machine; two co-axial circuit closer shafts having contact-carrying discs spaced apart; cooperating contact pins carried by said discs; power transmitting connections between said first motion shaft and one of said circuit closer shafts; power transmitting connections between said pilot drum and the other of said circuit closer shafts, said power transmitting connections being such that when the first motion shaft and the pilot drum are rotating at normal speeds, said circuit closer shafts will turn in unison; and electric circuit connections between the respective contact pins and the respective electro-magnetically actuated gear shifters and a source of electrical energy in virtue of all of which the thread will be fed from the beam at a substantially constant linear speed.

7. In an automatic beam let-off for knitting machines wherein is provided a first motion shaft and a beam; an infinitely variable speed power transmitting unit including an input shaft, an output shaft and an adjuster shaft; a driving connection between said first motion shaft and said input shaft; a driving connection between said output shaft and said beam, a splined shaft; a driving connection between said first motion shaft and said splined shaft; shiftable gear connections between said splined shaft and said adjuster shaft; electro-magnetically actuated gear shifters for said shiftable gear connections for operating said adjuster shaft in reversed directions at times, a pilot drum around which thread from the beam is wound before passing to thread guides of the knitting machine; two co-axial circuit closer shafts having contact-carrying discs spaced apart; cooperating contact pins carried by said discs; power transmitting connections between said first motion shaft and one of said circuit closer shafts; power transmitting connections between said pilot drum and the other of said circuit closer shafts, said power transmitting connections being such that when the first motion shaft and the pilot drum are rotating at normal speeds, said circuit closer shafts will turn in unison; and electric circuit connections between the respective contact pins and the respective electro-magnetically actuated gear shifters and a source of electrical energy in virtue of all of which the thread will be fed from the beam at a substantially constant linear speed.

GEORGE O. YOUNG.

REFERENCES CITED

The following references are of record in the file of this patent:

UNITED STATES PATENTS

| Number    | Name    | Date          |
|-----------|---------|---------------|
| 1,366,100 | Rhoades | Jan. 18, 1921 |
| 2,259,115 | Rayden  | Oct. 14, 1941 |
| 2,334,058 | Bassist | Nov. 9, 1943  |